United States Patent
Hino et al.

(10) Patent No.: US 9,062,663 B2
(45) Date of Patent: Jun. 23, 2015

(54) ACTUATOR

(75) Inventors: Tetsuo Hino, Yamato (JP); Jun Yamamoto, Tokyo (JP); Sakae Suda, Yokohama (JP); Sotomitsu Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 13/513,913

(22) PCT Filed: Nov. 26, 2010

(86) PCT No.: PCT/JP2010/071751
§ 371 (c)(1),
(2), (4) Date: Jun. 5, 2012

(87) PCT Pub. No.: WO2011/070988
PCT Pub. Date: Jun. 16, 2011

(65) Prior Publication Data
US 2012/0235545 A1      Sep. 20, 2012

(30) Foreign Application Priority Data
Dec. 8, 2009   (JP) .................................. 2009-278960

(51) Int. Cl.
*H01L 41/193* (2006.01)
*F03G 7/00* (2006.01)

(52) U.S. Cl.
CPC ...................................... *F03G 7/005* (2013.01)

(58) Field of Classification Search
CPC .......................... H01L 41/0833; H01L 41/047
USPC ................................................. 310/365, 366
See application file for complete search history.

(56) References Cited

U.S. PATENT DOCUMENTS

| | | | |
|---|---|---|---|
| 5,572,309 A * | 11/1996 | Nishio et al. .................. | 399/389 |
| 7,972,537 B2* | 7/2011 | Meng et al. .................... | 252/511 |
| 2009/0004476 A1* | 1/2009 | Zama et al. ................ | 428/411.1 |
| 2009/0058223 A1* | 3/2009 | Micallef ....................... | 310/308 |
| 2009/0085444 A1* | 4/2009 | Alvarez Icaza Rivera et al. ............................. | 310/365 |
| 2010/0039001 A1* | 2/2010 | Kudoh .......................... | 310/366 |
| 2010/0148635 A1* | 6/2010 | Kwon et al. .................. | 310/365 |

FOREIGN PATENT DOCUMENTS

| | | |
|---|---|---|
| JP | 2005-176428 A | 6/2005 |
| JP | 2005176428 A | 6/2005 |
| JP | 2007-244103 A | 9/2007 |
| JP | 2007244013 A | 9/2007 |
| JP | 2008-148452 A | 6/2008 |
| JP | 2008-266532 A | 11/2008 |
| JP | 2009-112100 A | 5/2009 |
| JP | 2009-278787 A | 11/2009 |
| JP | 2009278787 A | 11/2009 |

* cited by examiner

*Primary Examiner* — Derek Rosenau
*Assistant Examiner* — Bryan Gordon
(74) *Attorney, Agent, or Firm* — Canon USA Inc. IP Division

(57) ABSTRACT

A difference is arisen in the electric potential of the electrode layer between a fixed end portion and a displacement end portion of an actuator. The electrode layer includes a bundle of polymer fibers containing a conductive material. Longitudinal directions of the polymer fibers are arranged parallel to a direction from the fixed portion to the displacement end portion of the actuator.

6 Claims, 5 Drawing Sheets

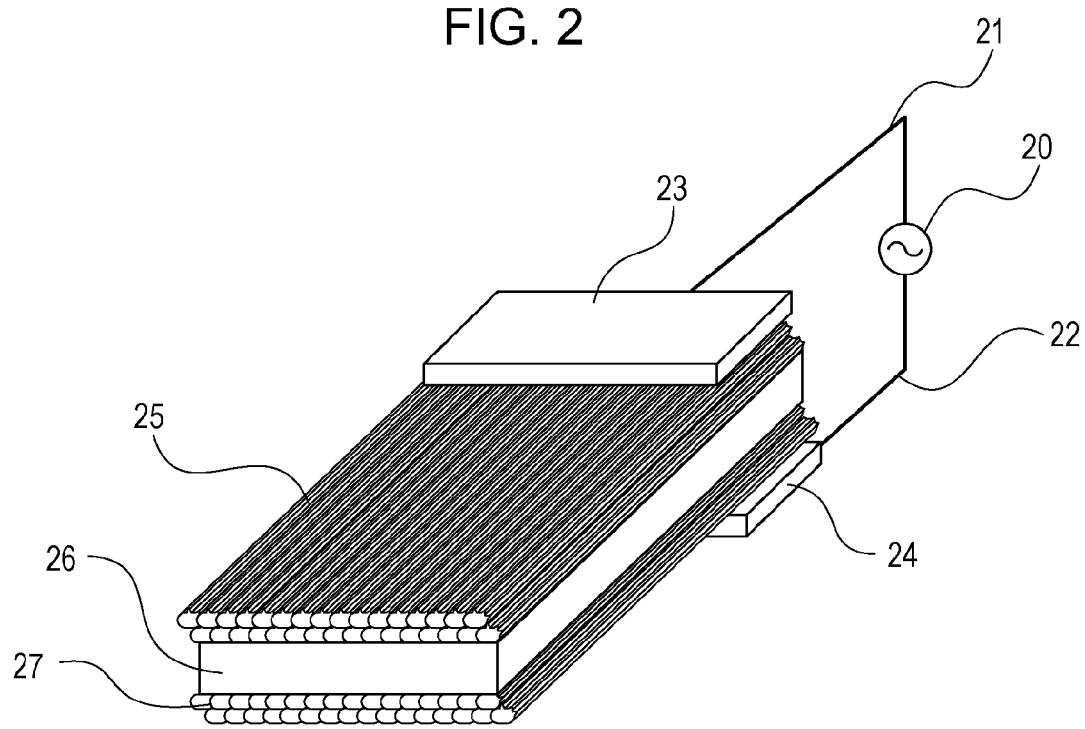

ACTUATOR

TECHNICAL FIELD

The present invention relates to an actuator.

BACKGROUND ART

In recent years, there has been the development of actuators composed of organic polymers.

PTL 1 discloses a long actuator including a pair of long electrode layers each containing a conductive material (carbon nanotubes), an ionic liquid, and a polymer and an ion-conductive layer arranged between the pair of electrode layers, the ion-conductive layer (electrolyte layer) containing an ionic liquid and a polymer. A longitudinal end of the actuator is held by terminals. A voltage is applied to the terminals to transfer carriers, i.e., electrons or holes, in each of the electrode layers, thereby creating a potential difference between the electrode layers and causing bending deformation.

For the long actuator described in PTL 1, however, the electrode layers have a problem of the aggregation of the conductive material. Thus, when a voltage is applied to the terminals arranged at the longitudinal end of the actuator, a potential difference is created between the end and the other longitudinal end.

CITATION LIST

Patent Literature

PTL 1 Japanese Patent Laid-Open No. 2005-176428

SUMMARY OF INVENTION

Aspects of the present invention provide an actuator having a reduced potential difference between one longitudinal end and the other end of an electrode layer.

An actuator includes a pair of electrode layers, an electrolyte layer arranged between the pair of electrode layers, the electrolyte layer containing an electrolyte, and terminals in contact with the pair of electrode layers, the terminals being configured to apply a voltage between the electrode layers, in which at least one of the pair of electrode layers includes a plurality of linear electrodes in contact with the electrolyte layer, longitudinal directions of the linear electrodes being arranged parallel to a direction from a terminal portion where the at least one of the electrode layers is in contact with a corresponding one of the terminals toward an end portion of the at least one of the electrode layers, and the end portion being remote from the terminal portion, and in which the application of a voltage to the terminals allows ions in the electrolyte layer to be transferred, thereby displacing the end portion.

According to aspects of the present invention, it is possible to reduce the potential difference in each of the electrode layers.

BRIEF DESCRIPTION OF DRAWINGS

FIG. 2 is a schematic perspective view of an actuator including polymer-fiber electrode layers according to an embodiment of the present invention.

DESCRIPTION OF EMBODIMENTS

An actuator according to an embodiment of the present invention will be described below with reference to FIGS. 1A to 1C. The actuator according to this embodiment of the present invention includes terminals in contact with a pair of electrode layer, the terminals being configured to apply a voltage to the electrode layers. The terminals are arranged at a fixed portion of the actuator. The bending deformation of the actuator is caused by the displacement of an end (displacement end) remote from the fixed portion.

Figure 1A:
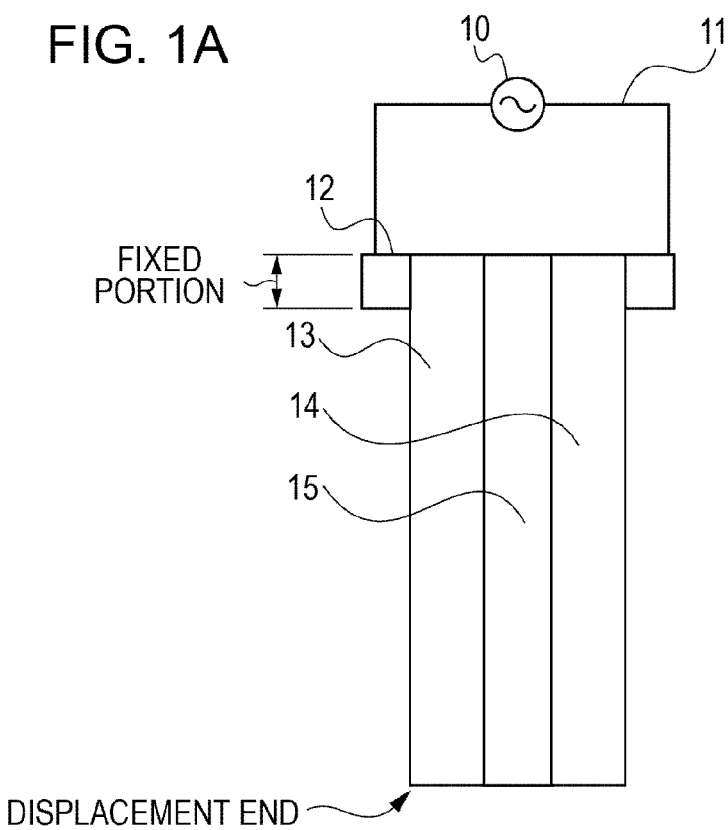
FIG. 1A is a schematic diagram of an actuator according to an embodiment of the present invention.
Figure 1B:
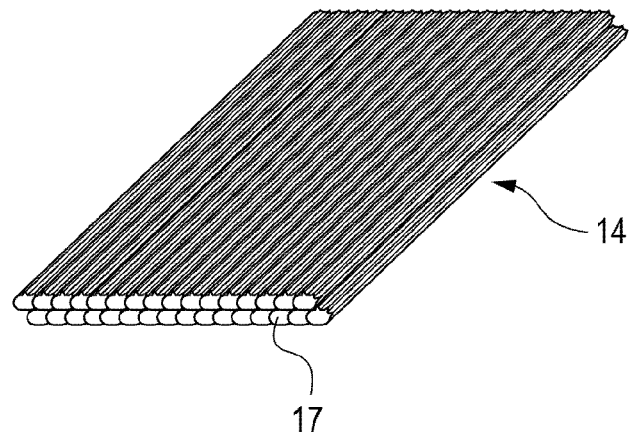
FIG. 1B is a schematic diagram of a polymer-fiber electrode layer according to an embodiment of the present invention.
Figure 1C:
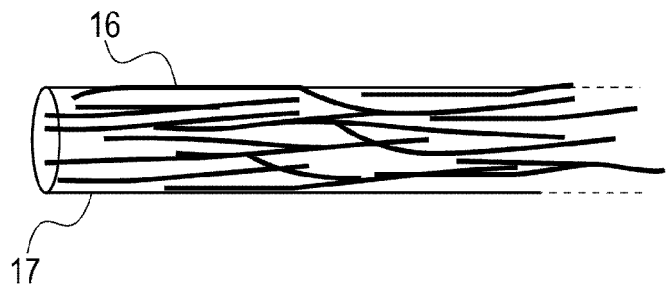
FIG. 1C is a schematic diagram of a single polymer fiber according to an embodiment of the present invention.
Figure 5:
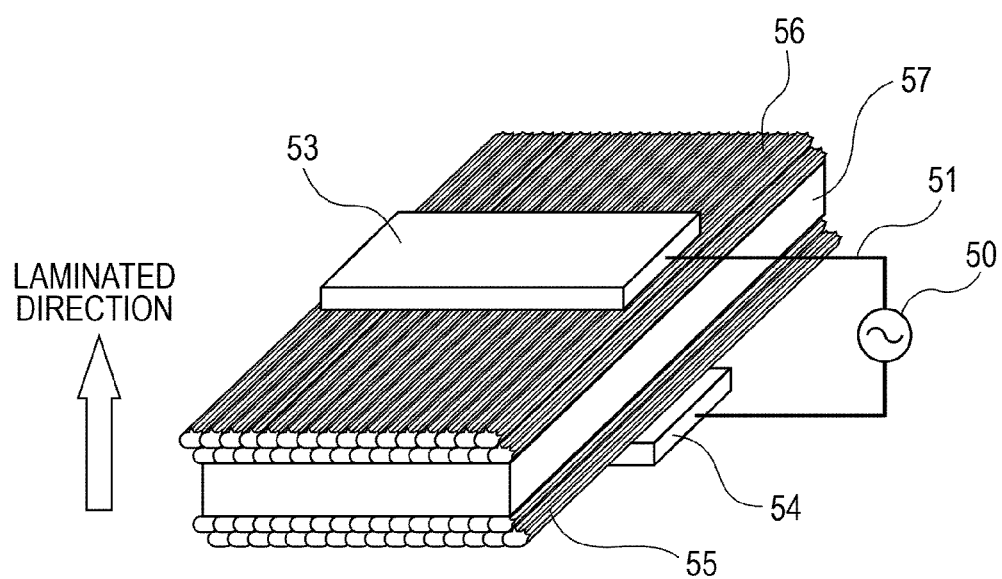
FIG. 5 is a schematic perspective view of an actuator including terminals, to which a voltage can be applied, located in the middle portion of electrode layers.

In FIGS. 1A to 1C, the fixed portion where the terminals are fixed is located at an end portion and thus is referred to as the "fixed end portion" in the following description. However, the actuator is not limited to the structure. For example, as illustrated in FIG. 5, the fixed portion may be located in the middle portion.

At least one of the pair of electrode layers includes a plurality of linear electrodes. The plural linear electrodes can be formed of bundles of polymer fibers containing a conductive material. Longitudinal directions of the linear electrodes are arranged parallel to a direction from a portion in contact with the terminals toward the other end portion. That is, the longitudinal directions of the linear electrodes are arranged parallel to a direction from the fixed portion toward the end portion of the actuator illustrated in FIGS. 1A to 1C. In FIG. 1A to 1C, the fixed portion is located at one end portion. Thus, the longitudinal directions of the linear electrodes are arranged parallel to a direction from the one end portion toward the other end portion. The arrangement of the plural linear electrodes reduces a potential difference between the end portion to be deformed and the fixed end portion having the terminals.

The actuator according to this embodiment as illustrated in FIGS. 1A to 1C includes the fixed end portion and the displacement end portion. A deformation force exerted on a region from the fixed portion to the displacement end portion causes the displacement of the displacement end portion. When a state in which a structure from the fixed end portion to the displacement end portion is in the form of a straight line is defined as zero (zero-displacement state), the term "displacement" used here indicates a state in which the displacement end portion is bent from the zero-displacement state.

The terminals are arranged at the fixed end portion in order to apply a voltage to the pair of electrode layers of the actuator. The terminals may be arranged at a portion other than the fixed end portion. To achieve a long distance from the displacement end portion, the terminals can be arranged at the fixed end portion.

Each of the electrode layers can have a long shape with a long axis and a short axis. When each electrode layer has a long shape, longitudinal directions of the polymer fibers can be arranged parallel to the long axis. Alternatively, the longitudinal directions of the polymer fibers can be arranged parallel to the short axis.

Structure of Actuator

An actuator according to an embodiment of the present invention has a structure in which a pair of electrode layers 13 and 14 each having a long shape and an electrolyte layer 15 arranged between the electrode layers are stacked. FIG. 1A is a schematic view of the actuator according to this embodiment of the present invention when viewed from a direction perpendicular to the laminated direction (right and left directions of the paper plane in this figure) of the electrode layers 13 and 14 and the electrolyte layer 15. Reference numeral 12 denotes terminals configured to apply a voltage between the electrode layers. The terminals 12 are connected to a driving power source 10 through leads 11. The terminals 12 hold one end of the actuator. When a voltage from the driving power source 10 is applied to the terminals 12, a voltage of about 1 V to about 4 V is applied between the electrode layers 13 and 14. Ions in the electrolyte are transferred into at least one of the electrode layers, causing bending deformation in such a manner that the longitudinal end of the actuator moves in the laminated direction.

At least one of the electrode layers 13 and 14 includes a plurality of linear electrodes as illustrated in FIG. 1C. The linear electrodes may be composed of a conductive material itself, such as a metal. Alternatively, the linear electrodes can include polymer fibers 17 containing a conductive material 16. Furthermore, the polymer fibers are arranged parallel to the longitudinal direction of the electrode layers as illustrated in FIG. 1B. Thus, directions of particles of the conductive material 16 are arranged parallel to the longitudinal direction. Hence, when a voltage is applied to the electrode layers through the terminals, electrons (holes) are easily transferred from the longitudinal end where the terminals of the electrode layers are provided to the other longitudinal end, thereby reducing the potential difference in each electrode layer. Since the at least one electrode is composed of the plurality of linear electrodes, the at least one electrode is more flexible than that of an electrode film composed of a bulk material. This is also an advantageous effect of the present invention.

In such a structure according to this embodiment, when each of the electrode layers has a longitudinal length of 1 cm, the potential difference between both ends can be set to about 0.01 V to about 0.04 V. In other words, the difference between a voltage between the electrode layers at one longitudinal end of the electrode layers and a voltage between the electrode layers at the other longitudinal end can be reduced to about 0.01 V to about 0.04 V. This makes it possible to increase the displacement of the actuator.

In the case where both the electrode layers 13 and 14 include the polymer fibers 17 containing the conductive material 16, the generation of a potential difference can be suppressed in both the electrode layers.

The actuator according to this embodiment of the present invention has been described above by taking the actuator having a rectangular cross section perpendicular to the laminated direction as an example. However, the cross section may have any shape so long as it has a long shape in which the longer side is longer than the shorter side. For example, the cross section may have an elliptic shape or a rhombic shape. Furthermore, in this embodiment, the electrode layers 13 and 14 have the same shape as illustrated in FIGS. 1A to 1C. However, the two electrode layers according to an embodiment of the present invention may have different shapes.

Here, the electrode layer 13 and/or the electrode layer 14 serves as an electrode layer including at least the polymer fibers containing the conductive material (hereinafter, also referred to as a "polymer-fiber electrode layer"), in which the polymer fibers are arranged along the uniaxial direction in the plane of the corresponding electrode layer. FIG. 1B illustrates this state. This structure in which the polymer fibers 17 contain the conductive material has the following advantages: That is, in a process of forming the polymer fibers, the conductive material 16 such as carbon nanotubes (CNTs) is extended in a narrow region of each polymer fiber in the longitudinal direction of the fiber. This suppresses aggregation and entanglement of the conductive material 16 such as CNTs and regularly arranges the conductive material 16 such as CNTs in the longitudinal direction of the polymer fibers. In other words, as illustrated in FIG. 1C, the conductive material 16 such as CNTs are uniformly dispersed, resulting in the electrode layers having satisfactory electrical conductivity. In the case where the resulting electrode layer is used for the actuator, a voltage is efficiently applied from a driving power source to the plane of the electrode layer. That is, in the case where an actuator includes the electrode layer which has satisfactory electrical conductivity and in which a voltage can be uniformly applied to the plane of the electrode layer, the amount of displacement during driving can be increased.

In the case where all the electrodes are formed of the polymer-fiber electrode layers, the directions of the polymer fibers in the planes of the respective polymer-fiber electrode layers may be the same or different. In the case where the polymer fibers in the planes of the respective polymer-fiber electrode layers are arranged in the same direction, an ion-conducting actuator having excellent properties, for example, faster deformation response, can be produced. In the case where only one electrode is formed of the polymer-fiber electrode layer, an asymmetric electrode layer structure is obtained. In this case, for example, a combination of the polymer-fiber electrode layer and a film-like electrode layer can result in an actuator having a direction in which deformation response occurs easily. That is, for example, in an actuator having a three-layer structure of polymer-fiber electrode layer (A)/electrolyte layer/film-like electrode layer (B), the uniform application of a potential is easily achieved in the plane of the polymer-fiber electrode layer (A) compared with the film-like electrode layer (B). In the case where the actuator is driven using the polymer-fiber electrode layer (A) as a cathode so as to cause the bending deformation toward the film-like electrode layer (B), the displacement response is increased, as compared with the case where the actuator is driven using the film-like electrode layer (B) as a cathode so as to cause the bending deformation toward the polymer-fiber electrode layer (A). Here, the symbol "/" indicates that the layers that sandwich the symbol "/" are in contact with each other.

Figure 4:
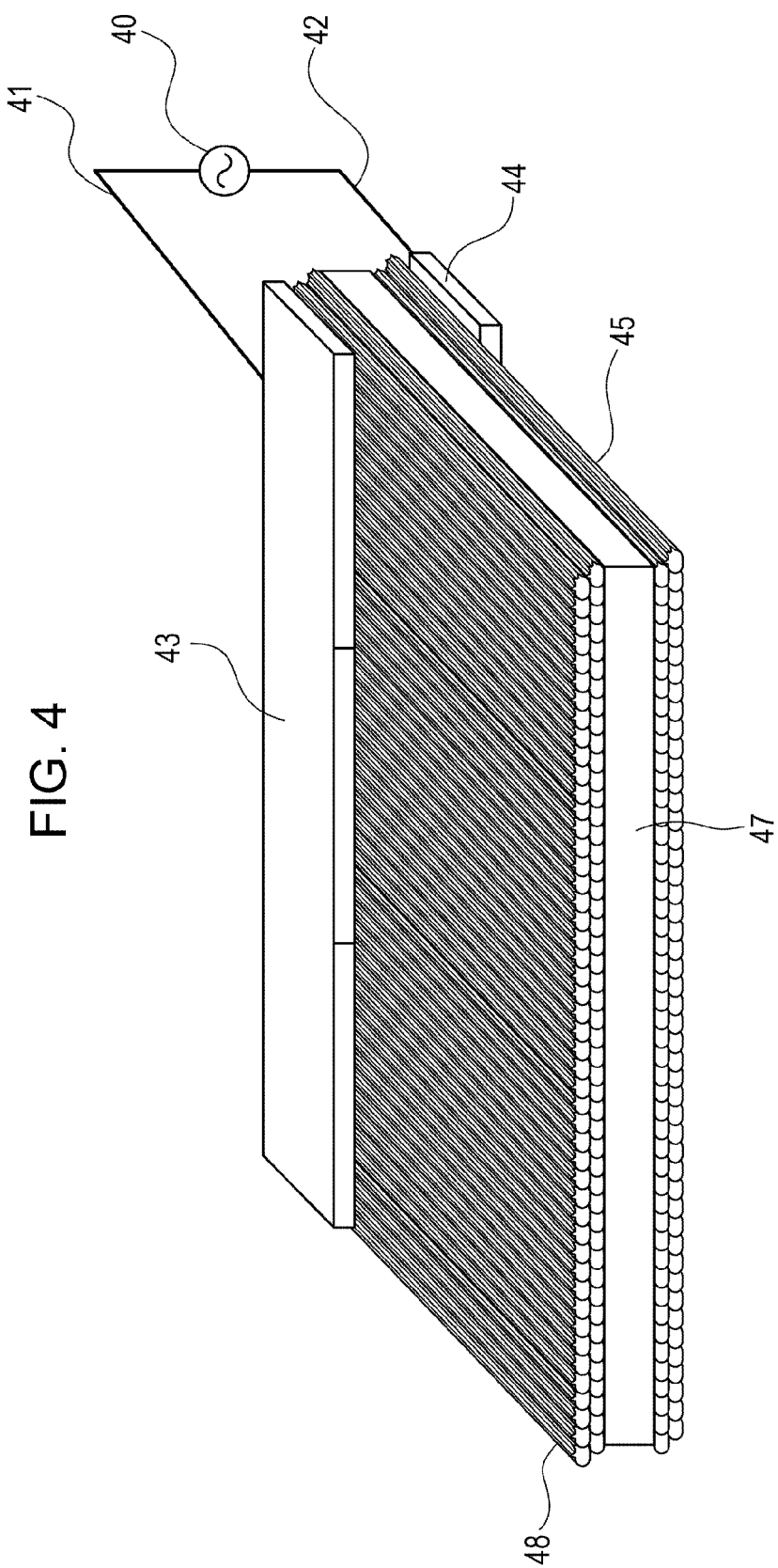
FIG. 4 is a schematic perspective view of an actuator including terminals, to which a voltage can be applied, arranged along long sides of electrode layers according to the embodiment of the present invention.

In addition, as illustrated in FIG. 4, the electrode layer according to aspects of the present invention may have a structure in which terminals 43 and 44, to which a voltage can be applied, are arranged along long sides of horizontally long polymer-fiber electrode layers including polymer fibers 48. From the viewpoint of the displacement of the actuator, as described above, the electrode layers can have a long shape in which the distance between the one end portion and the other end portion is large (long working length of the actuator). However, from the viewpoint of a force generated, the structure as illustrated in FIG. 4 can be used. That is, in the structure illustrated in FIG. 4, a supporting portion configured to support the actuator can be more securely stabilized. Furthermore, a short working length of the actuator permits a heavier object to be stably driven without buckling. The basic structure of the actuator illustrated in FIG. 4 is the same as that in illustrated in FIG. 2. The actuator has a structure in which a pair of electrode layers 45 and 48 and an electrolyte layer 47 arranged between the electrode layers are stacked. Reference numeral 41 represents a lead. Reference numeral 40 represents a driving power source.

Furthermore, a structure as illustrated in FIG. 5 may be used in which a fixed portion including terminals 53 and 54 is located in the middle portion of an actuator and in which both ends serve as displacement ends and are displaced. In this case, with respect to the displacement direction, the bending deformation of both ends occurs in a direction the same as a laminated direction (indicated by an arrow in the figure). The basic structure of the actuator illustrated in FIG. 5 is the same as that illustrated in FIG. 2. The actuator has a structure in which a pair of electrode layers 55 and 56 and an electrolyte layer 57 arranged between the electrode layers are stacked. Reference numeral 51 represents a lead. Reference numeral 50 represents a driving power source.

Moreover, for each electrode layer of the actuator according to aspects of the present invention, the longitudinal directions of the polymer fibers in the polymer-fiber electrode layer may be obliquely arranged with respect to a direction of the straight line from the corresponding terminal, to which a voltage is applied, to the other end portion so long as the polymer fibers at least extend from the terminal, to which a voltage is applied, on the electrode layer of the actuator to the other end portion of the electrode layer. That is, for example, in the case of the electrode layer having a square shape, the polymer fibers may be obliquely arranged at an angle of about 45° at a maximum in the plane of the electrode layer with respect to a direction of the straight line from the terminal, to which a voltage is applied, to the other end portion. In the case where the polymer fibers are obliquely arranged at an angle exceeding 45°, the potential difference between the terminal, to which a voltage is applied, and the end portion is not reduced, in some cases. Note that in the case where the polymer fibers are obliquely arranged with respect to the direction of the straight line from the terminal, to which a voltage is applied, to the end portion, it is possible to cause bending deformation (torsional bending deformation) to which a twisting motion is imparted in the direction of the arrangement of the fibers. Needless to say, the inclination of the polymer fibers in the plane of one electrode layer of the pair of electrode layers is not necessarily equal to that of the other electrode layer. If they have the same inclination, larger torsional bending deformation can be provided.

For the polymer-fiber electrode layer according to aspects of the present invention, in the case where at least some of the polymer fibers are fused, it is possible to form a structure in which even if a heavy load is applied during the pressure motion of the actuator, the fibers are less likely to be displaced (the electrode layer has high mechanical strength as a film) because the polymer fibers are bonded. In this case, even if a heavy load is applied, the degree of the uniaxial orientation of the polymer fibers is prevented from being reduced. This results in stable suppression of the occurrence of a potential difference between an end portion, to which a voltage is applied, and the other end.

Furthermore, interstices in the polymer-fiber electrode layer may be filled with, for example, a known flexible conductive polymer material or conductive gel material containing CNTs and an ionic liquid so long as the performance of the actuator is not reduced. In addition, the polymer-fiber electrode layer may be embedded in the flexible conductive polymer material or the conductive gel material. In the case of such a structure, the fibers are less likely to be displaced even if a load is applied. In this case, even if a heavy load is applied, the degree of the uniaxial orientation of the polymer fibers is prevented from being reduced. This results in stable suppression of the occurrence of a potential difference between an end portion, to which a voltage is applied, and the other end. Needless to say, a combination of the foregoing structure and the fusion of the polymer fibers described above enhances the effect of suppressing a reduction in the degree of the uniaxial orientation of the polymer fibers due to a load from an object to be driven.

FIG. 2 is a schematic cross-sectional view of an actuator including a polymer-fiber electrode layer according to an embodiment of the present invention. In an actuator 2, an electrolyte layer 26 is held by electrodes 25 and 27. Metal plates 23 and 24, to which a voltage is applied, are arranged on portions of the electrodes and are provided with leads 21 and 22, respectively, connected to a driving power source 20. At least one of the pair of electrodes serves as an electrode layer including polymer fibers that contain a conductive material. The polymer fibers are arranged in the uniaxial direction in the plane of the electrode layer.

The actuator according to an embodiment of the present invention may have any shape. Examples of the shape that can be selected include plate- and film-like shapes of circles, triangles, ellipses, and strips; and cylindrical shapes, helical shapes, and coil-like shapes in addition to the rectangular plate-like shape.

Furthermore, the actuator may have a structure including a single element or a composite structure including a plurality of elements.

Driving of Actuator

Figure 3A:
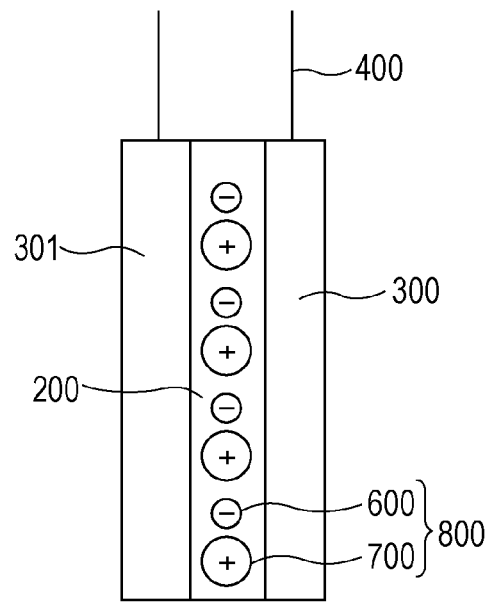
FIG. 3A illustrates a state of an actuator before the actuator is driven, according to an embodiment of the present invention.
Figure 3B:
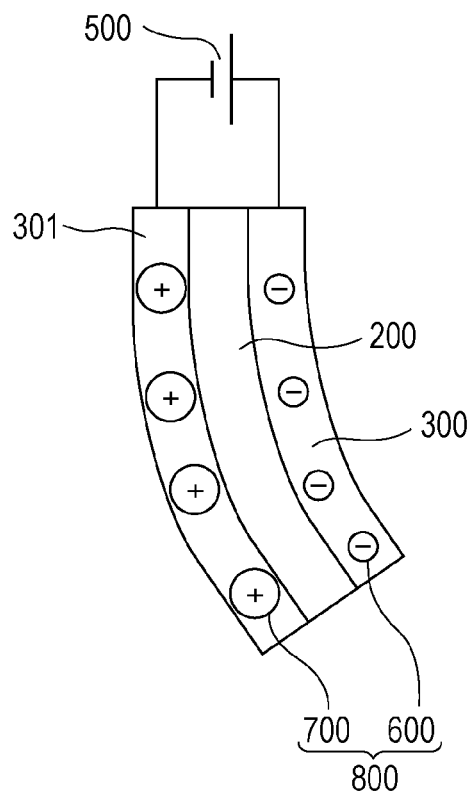
FIG. 3B illustrates a state of the actuator in operation, according to the embodiment of the present invention.

An actuator according to an embodiment of the present invention is deformed by applying a voltage to the pair of electrodes to cause the transfer of ions in the electrolyte layer. The driving principle of the actuator including the electrolyte layer arranged between the pair of electrodes according to an embodiment of the present invention is not clear. So, a current hypothetical principle will be described with reference to FIG. 3 by taking an element, which can be used for an actuator according to an embodiment of the present invention, including an electrolyte layer arranged between two electrode layers as an example. As illustrated in FIG. 3A, two electrode layers 300 and 301 are formed on surfaces of an electrolyte layer 200 so as to be insulated from each other. As illustrated in FIG. 3B, the application of a potential difference between the electrode layers 300 and 301 allows cations 700 in an electrolyte layer 800 to be transferred and penetrated into the electrode layer 301 serving as a cathode, and allows anions 600 in the electrolyte layer 800 to be transferred and penetrated into the electrode layer 300 serving as an anode. As a result, an electric double layer is formed at the interface between an ionic-substance phase and a conductive material in the electrode layers 300 and 301. From the viewpoint of producing an actuator capable of operating in air, an ionic liquid with a negligible vapor pressure can be used as an electrolyte for use in the actuator according to an embodiment of the present invention. For the ionic liquid, the ionic radius of each of the cations 700 is larger than that of each of the anions 600. The electrode layer 301 is more expanded than the electrode layer 300 because of the synergistic effect of the steric effects of ions in the electrode layers and electrostatic repulsion due to the electric double layer, so that the actuator bends in a direction in which the cathode extends compared with the anode. Usually, when the polarity of the potential is reversed, the film bends in the opposite direction. Furthermore, the direction of displacement varies depending on the structures of the electrode layers and the electrolyte layer.

An extensive operation and a torsional operation can be achieved by designing the structure of the electrolyte layer, the arrangement of the electrode layers, and so forth, other than the bending operation.

The applied voltage to an actuator according to an embodiment of the present invention can be set to a value equal to or less than the withstand voltage of the electrolyte. For example, in the case where an ionic liquid is used as the electrolyte, the applied voltage can be set to 4 V or less.

Electrode

An actuator according to an embodiment of the present invention includes a pair of electrodes and an electrolyte layer arranged between the pair of electrodes, the electrolyte layer containing an electrolyte. At least one of the pair of electrodes serves as an electrode layer including at least polymer fibers that contain a conductive material. The polymer fibers need to be arranged in the uniaxial direction in the plane of the corresponding electrode layer.

The term "electrode" used here indicates an electrode composed of a metal, a carbon-based conductive material free from a polymer, for example, a self-supported film formed by pressing CNTs, or a composite thereof.

Polymer-Fiber Electrode Layer

In an actuator according to an embodiment of the present invention, at least one of a pair of electrodes serves as an electrode layer including polymer fibers that contain a conductive material, and is formed of, for example, a composite containing a carbon-based conductive material and a polymer. In an actuator according to an embodiment of the present invention, the term "polymer fibers" is used to indicate fibers composed of at least one polymer, each fiber of the polymer having a length greater than the thickness of the fiber of the polymer.

Here, each of the polymer fibers has a thickness of 0.05 μm to 50 μm and has a length 10 or more times the thickness. In particular, for the polymer fibers containing the conductive material, a smaller thickness of the fiber enhances the effect in which the conductive material such as CNTs is extended in a narrow region of each polymer fiber in the longitudinal direction of the fiber to suppress aggregation and entanglement of the conductive material such as CNTs and to regularly arrange (uniformly disperse) the conductive material such as CNTs in the longitudinal direction of the polymer fibers. Thus, each of the polymer fibers can have a thickness of 0.05 μm to 10 μm. In particular, when each of the fibers has a thickness of 0.05 μm or more and less than 1 μm, a supramolecular arrangement effect due to the nanosized fibers is significantly induced. This increases the proportion of the conductive material uniformly dispersed in the polymer fibers, thereby further improving the electrical conductivity of the resulting polymer fibers containing the conductive material such as CNTs. That is, in the polymer nanofibers, the conductive material molecules are regularly arranged in each fiber with the molecular chains extended because of a small thickness of each fiber, thereby significantly suppressing aggregation and entanglement of the conductive material such as CNTs. It is thus possible to produce an ion-conducting actuator having excellent properties, for example, significantly faster deformation response.

The cross-sectional shape of each of the polymer fibers is not particularly limited and may be a circular shape, an elliptical shape, a rectangular shape, a polygonal shape, or a semicircular shape. Alternatively, the cross-sectional shape may be an indefinite shape. Furthermore, different cross sections may have different shapes. To increase the surface conductivity, an electrically conductive material, e.g., a metal or carbon, may be added to surfaces of the polymer fibers. In the case where each of the polymer fibers has a circular cross section, the thickness of the polymer fiber indicates the diameter of the circle of the cross section. In other cases, the thickness indicates the length of the longest straight line passing through the barycenter of the cross section of each fiber.

Method for Producing Polymer Fibers

A method for producing polymer fibers for use in an actuator according to an embodiment of the present invention is not particularly limited. Examples thereof include electrospinning, multi-component fiber spinning, polymer blend spinning, melt blowing, and flash spinning methods.

Among these methods, the electrospinning method can be employed because various polymers can be spun into fibers, the shape of fibers can be relatively easily controlled, and nanosized fibers can be produced by the method.

The method for producing polymer fibers by the electrospinning method is performed using a high-voltage power supply, a polymer solution, storage tank, a spinneret, and a grounded collector. The polymer solution is extruded from the tank to the spinneret at a constant speed. A voltage of 1 to 50 kV is applied to the spinneret. When the electrostatic attraction exceeds the surface tension of the polymer solution, a jet of the polymer solution is ejected toward the collector. At this point, a solvent in the jet evaporates gradually. When the jet reaches the collector, the jet is reduced in size to have a size on the order of nanometers. Then an electrode layer is formed on the collector. Note that a polymer heated to a temperature equal to or higher than its melting point may be used in place of the polymer solution.

Fusion of Polymer Fiber Containing Conductive Material

The term "fusion" of the polymer fibers according to aspects of the present invention is used to indicate a state in which bonded interfaces obtained by softening the polymer fibers and bonding to adjacent polymer fibers have planar shapes or a state in which when the polymer fibers are softened and bonded to adjacent polymer fibers, there is no bonded interface therebetween.

A method of fusion described above is not particularly limited. Examples thereof include thermal fusion, ultrasonic fusion, friction fusion, heat press bonding (hot pressing), and bonding using another constituent such as an adhesive. Fusion by heat can be used in view of easy handling and so forth. Furthermore, hot pressing can be used because a uniform thickness is easily provided. The term "hot pressing" used here includes pressing while heat is being applied; and an increase in temperature while a workpiece is being pressed.

The temperature, pressing pressure, and time in the hot pressing are not particularly limited so long as the temperature is less than the decomposition temperature of the foregoing polymer. These conditions may be appropriately determined in response to a polymer used, a polymer compound included in the actuator, and the type of ion transferred. For example, the temperature in the hot pressing may be in the range of 30° C. to 150° C. The pressing pressure is preferably in the range of 1 to 100 kg/cm$^2$ and more preferably 10 to 50 kg/cm$^2$.

The fusion of the polymer fibers can be checked by SEM observation before and after a fusion step. For convenience, the fusion of the polymer fibers can be qualitatively checked by measuring the strength of an electrode layer including the polymer fibers. That is, the fusion of the polymer fibers can be easily checked by measuring the Young's modulus of the target film (electrode layer) before and after the fusion step.

To quickly check the fusion, in particular, in the case where the electrode layer is formed of only bundles of the polymer fibers, a film before and after the fusion step is stretched with researcher's hands in a direction perpendicular to the direction of uniaxial orientation of the polymer fibers, and degrees of tearing thereof are compared.

The polymer fibers included in the actuator according to an embodiment of the present invention contain a conductive material. The conductive material is not particularly limited but may be dispersed and held by the polymer fibers. For example, a method for producing the polymer fibers is as follows: The conductive material is pulverized in the presence of an ionic liquid or, as needed, a polymer under shearing force, thereby forming a conductive material dispersion. The conductive material is dispersed in a polymer solution in advance. Then, for example, the electrospinning method is performed to form the polymer fibers.

In this pulverization step, a method for imparting the shearing force thereto is not particularly limited. In the case of small-scale production in, for example, a laboratory, the conductive material may be ground with a manual or automatic mortar. For mass production, a wet-grinding device, e.g., a ball mill, a roller mill, and a vibration mill, capable of giving high shearing force can be used. Furthermore, a kneader may be used. Moreover, in view of the viscosity of the dispersion, the shearing force may be applied after a solvent is added to the dispersion to appropriately adjust the viscosity of the dispersion. The time needed for the pulverization is not particularly limited but may be appropriately changed in response to the degree of pulverization suitable for an intended application. The time is usually in the range of about 5 minutes to about 1 hour. Thereby, the conductive material dispersion is produced.

In an actuator according to an embodiment of the present invention, carbon nanotubes and an ionic liquid that can be used as materials for the electrode layer form a gel composition, thus resulting in satisfactory dispersion of the carbon nanotubes. Although the formation mechanism and the structure of the gel composition are still not clear, their broad outlines drawn from various analytical results are understood as follows.

(1) The pulverization treatment under shearing force does not cause the chemical modification of the carbon nanotubes, reduces the entanglement of the carbon nanotubes, and leads to a change in physical shape, i.e., reduces the thickness of the bundles of the carbon nanotubes.

(2) It is speculated that the formation of the gel is not attributed to the entanglement of the carbon nanotubes. In other words, it is speculated that the formation of the gel is attributed to a crosslinked structure (three-dimensional network structure) formed by the fact that molecules of the ionic liquid are bonded by "cation-$\pi$ interactions" to surfaces of carbon nanotubes having a reduced degree on entanglement and then link the bundles of the carbon nanotubes to each other by ionic bonding.

In an actuator according to an embodiment of the present invention, the polymer fibers can contain an electrolyte. A method for incorporating the electrolyte thereinto is not particularly limited. For example, there is provided a method in which after the polymer fibers are produced, the polymer fibers are immersed in an electrolyte solution.

Japanese Patent Laid-Open No. 2008-266532 discloses among CNT gel actuators, an actuator in which CNTs in a film-like electrode layer are oriented in the plane of the electrode layer. This document discloses a method in which oriented CNTs, having significantly higher aspect ratios than those of commercially available products, are prepared by chemical vapor deposition (CVD) on a silicon substrate using a reaction atmosphere containing a small amount of water vapor and are transferred from the substrate and in which a polymer and an ionic liquid are added thereto. However, it is inevitably difficult to produce a large-area electrode layer by the method for producing the CNT-oriented electrode layer by transferring the oriented CNTs having high aspect ratios from the substrate.

In the actuator according to this embodiment, a large-area electrode layer having a size on the order of meters and having CNTs uniformly oriented in the plane of the electrode layer can be easily formed by arranging the plural polymer fibers in the uniaxial direction by the electrospinning method or the like.

Orientation of Polymer Fiber

In an actuator according to an embodiment of the present invention, the polymer fibers containing the conductive material are oriented in the uniaxial direction in the plane of the electrode layer. An orientation method of the polymer fibers is not particularly limited. Known techniques may be employed separately or in combination. The use of the electrospinning method makes it possible to very easily produce a polymer-fiber electrode layer including the polymer fibers that contain the conductive material, the polymer fibers being arranged in the uniaxial direction in the plane of the electrode layer. That is, a rotating drum capable of winding fibers is used as a collector. Spinning is continuously performed by ejecting a jet of the polymer solution to the collector, thereby producing the polymer-fiber electrode layer.

By controlling the winding speed of the rotating drum, it is possible to easily control the degree of uniaxial orientation of the polymer fibers and the thickness of each of the fibers. For example, it is possible to easily and effectively arrange the polymer fibers in the uniaxial direction by increasing the winding speed. In this case, the thickness of each fiber is reduced.

Degree of Polymer Orientation (%): The Proportion of the Polymer Fibers Arranged in the Uniaxial Direction in the Plane of the Electrode Layer, and a Higher Degree of Polymer Orientation Indicating Higher Orientation The proportion of the polymer fibers arranged in the uniaxial direction in the plane of the electrode layer can be measured by a method described below. That is, an image of the polymer-fiber electrode layer is formed by scanning electron microscope (SEM) observation. The image is analyzed by means of image-processing software (trade name: A-Zou Kun, manufactured by Asahi Kasei Engineering Corporation) using an analysis command "direction distribution measurement", thereby simply calculating the degree of polymer orientation (%). Specifically, the range of observed inclination values is divided into 18 equal intervals ranging from 0° to 180° in increments of 10°. Then a frequency distribution graph (histogram) of the number of fibers (frequencies) of each interval is drawn. The degree of polymer orientation is determined from following formula:

$$\text{Degree of orientation (\%)} = \frac{\text{Number of intervals containing frequencies equal to or less than half the maximum frequency}}{\text{Total number of intervals}} \times 100 \qquad [\text{Math. 1}]$$

A higher degree of orientation indicates a higher proportion of the polymer fibers arranged in the uniaxial direction in the plane of the electrode layer. In an actuator according to an embodiment of the present invention, the phrase "polymer fibers are arranged in the uniaxial direction in the plane of the electrode layer" indicates that the polymer-fiber electrode layer has a degree of polymer fibers of 30 or more.

In the case where the degree of orientation of the conductive material in the polymer fibers in the longitudinal directions of the polymer fibers is 80 or more, the degree of orientation of the conductive material in the uniaxial direction is increased, thereby improving the electrical conduction properties in the orientation direction and the mechanical strength. This results in an ion-conducting actuator having excellent mechanical strength properties and very fast deformation response.

Proportion of Orientation of Conductive Material (P Value): The Proportion of the Polymer Fibers Arranged in the Uniaxial Direction in the Plane of the Electrode Layer, a Lower Value Indicating a Higher Proportion of Orientation The proportion of orientation of the conductive material may be determined from an image obtained by, for example, etching the surfaces of the polymer fibers and directly observing the conductive material in the polymer fibers using an electron microscope. Alternatively, the proportion of orientation of the conductive material may be simply evaluated by X-ray scattering measurement and polarization spectroscopy measurement of bundles of the polymer fibers or the film of the polymer fibers.

The evaluation of orientation using X-ray scattering measurement can be made on the basis of the anisotropy of the scattering-angle distribution of the scattered X-rays resulting from the conductive material of the electrode layer. In the case where the conductive material is highly oriented in the direction of the fiber axis, the scattered X-rays resulting from the conductive material show a streak-like scattering pattern concentrated on the equatorial direction of the fibers. In the case of a low degree of orientation of the conductive material, the degree of the anisotropy of the scattering pattern of the conductive material in the equatorial direction is reduced. For non-orientation, a completely isotropic scattering pattern is obtained. In this way, the orientation of the conductive material can be evaluated from the azimuthal angle anisotropy of an X-ray scattering pattern.

Polarization spectroscopy measurement is a technique for evaluating orientation and the degree of orientation from a polarization absorption spectrum, a polarization Raman spectrum, and so forth. For example, exemplary measurement of proportion of orientation (degree of orientation) of CNTs using polarization Raman-spectrum measurement will be described.

That is, the polarization Raman spectroscopy measurement is a measurement method described below. In Raman spectra attributed to CNTs when the electrode layer is irradiated with incident laser light from a target direction in which the conductive material is intended to be oriented (a direction perpendicular to the thickness direction and a direction of orientation in a bending direction or a direction of orientation in the thickness direction), a direction of the A axis and a direction perpendicular to the A axis, and a direction of the B axis, the orientation is evaluated by the proportion of orientation of the conductive material (P value) represented by the following formula:

$$P = Y/X$$

where P represents the proportion of orientation of the conductive material; X represents G-band intensity when the plane of polarization of the laser light is arranged parallel to the A axis; and Y represents G-band intensity when the plane of polarization of the laser light is arranged perpendicular to the plane of polarization of the laser light arranged parallel to the A axis (i.e., parallel to the B axis).

In an actuator according to an embodiment of the present invention, the foregoing P value can be in the range of 0 to 0.6. The P value asymptotically approaches zero when all the nanotubes are arranged in the intended direction. For random orientation, the P value is 1. The upper limit of the P value is preferably 0.2, more preferably 0.1, and still more preferably a value closer to zero. A P value exceeding 0.6 can lead to insufficient orientation.

Component of Actuator
Component of Polymer-Fiber Electrode Layer

The following materials are exemplified as the conductive material for the polymer-fiber electrode layer. That is, among carbon-based conductive materials, such as graphite, carbon black, acetylene black, Ketjen black, carbon whiskers (vapor-grown carbon), carbon (nano)fibers, activated carbon fibers, nanoscale carbon materials, and carbon nanoparticles, one or a mixture thereof are usually exemplified. A conductive polymer or the like can also be used. Among these materials, nanoscale carbon materials can be used from the viewpoint of achieving good conductivity and a high specific surface area. In particular, CNTs can be used.

CNTs are formed of a cylindrical graphite sheet and each have a cylindrical diameter of 1 to 10 nm. Carbon nanotubes used for the actuator according to this embodiment are a carbon-based material of a cylindrical graphene sheet. Carbon nanotubes are broadly categorized into single-walled carbon nanotubes (SWCNTs) and multi-walled carbon nanotubes (MWCNTs) on the basis of the number of peripheral walls, and various types are known. In an actuator according to an embodiment of the present invention, any type of carbon nanotube may be used.

The term "carbon nanoparticles" for use in an actuator according to an embodiment of the present invention indicates nanoscale ($10^{-6}$ to $10^{-9}$ m) particles mainly composed of carbon, e.g., carbon nanohorns, amorphous carbon, and fullerenes, other than carbon nanotubes. The term "carbon nanohorns" indicates carbon nanoparticles each having a shape in which a graphite sheet is rounded into a conical shape and in which the tip is conically capped.

Carbon nanofibers for use in an actuator according to an embodiment of the present invention are formed of cylindrical graphite sheets and each have a cylindrical diameter of 10 to 1000 nm. Carbon nanofibers are defined as carbon-based fibers each having a hollow structure and a thickness of 75 nm or more, and the carbon-based fibers are often branched. Examples of commercially available carbon nanofibers include VGCF and VGNF manufactured by Showa Denko K.K.

Graphene for use in an actuator according to an embodiment of the present invention indicates part of a graphite structure and the aggregate of carbon atoms in which six-membered carbon rings each having a planar structure are two-dimensionally arranged. That is, graphene is formed of a single carbon layer.

In an actuator according to an embodiment of the present invention, the amount of the conductive material added to the electrode layer can be set to 1% by weight or more with respect to the weight of the electrode layer. When the amount of the conductive material added is 1% by weight with respect to the weight of the electrode layer, the electrode layer can have an electrical conductivity sufficient to function as an electrode of the actuator. A conductive material content of less than 1% by weight can cause the electrode to have an insufficient electrical conductivity.

The thickness of the electrode layer is not particularly limited so long as the extending deformation of the actuator described above is not inhibited. Note that each of the electrode layers preferably has a thickness of 1 μm to 5 mm, more preferably 5 μm to 2 mm, and still more preferably 10 μm to 500 μm. When each electrode has a thickness of less than 1 μm, the electrical conductivity of the electrode layer can be insufficient for the actuator. When each electrode has a thickness exceeding 5 mm, the electrode layer containing the conductive material can be hard and brittle. The thickness and the material of the anode electrode layer and the cathode electrode layer do not need to be the same and can be appropriately selected in response to desired actuator characteristics.

The foregoing polymer included in the electrode layer is not particularly limited so long as it has flexibility sufficient to be deformed in response to the extending deformation of the actuator. The polymer can have a low degree of hydrolyzability and can have good stability in air. Examples of the polymer include polyolefin polymers, such as polyethylene and polypropylene; polystyrenes; polyimides; polyarylenes (aromatic polymers), such as poly-p-phenylene oxide, poly(2,6-dimethylphenylene oxide), and poly-p-phenylene sulfide; compounds of polyolefin polymers, polystyrenes, polyimides, polyarylenes (aromatic polymers), and so forth substituted with sulfonate groups (—SO3H), carboxyl groups (—COOH), phosphate groups, sulfonium groups, ammonium group, pyridinium groups, and so forth; fluorine-containing polymers, such as polytetrafluoroethylene and polyvinylidene fluoride; perfluorosulfonic acid polymers, perfluorocarboxylic acid polymers, perfluorophosphoric acid polymers having skeletons of fluorine-containing polymers substituted with sulfonate groups, carboxyl groups, phosphate groups, sulfonium groups, ammonium groups, pyridinium groups, and so forth; polybutadiene-based compounds; elastomers and gels of polyurethane-based compounds; silicone-based compounds; polyvinyl chloride; polyethylene terephthalate; nylon; and polyarylate. These compounds may be used alone or in combination. Furthermore, these compounds may be functionalized and copolymerized with other polymers.

In particular, a polyvinylidene fluoride-hexafluoropropylene copolymer [PVDF (HFP)], polyvinylidene fluoride (PVDF), polymethyl methacrylate (PMMA), and so forth can be exemplified from the viewpoint of achieving compatibility with the ionic liquid, etc. The polymer can have high compatibility with the electrolyte layer. Higher compatibility and bondability with the electrolyte layer make it possible to form a stronger electrode. To the end, the polymer can have a polymer structure the same type, similar, or identical to that of a high molecular compound of the electrolyte layer, or can have a functional group the same type, similar, or identical to that of a high molecular compound of the electrolyte layer.

As described above, the electrode of an actuator according to an embodiment of the present invention includes the polymer and the conductive material dispersed in the polymer and thus has electrical conductivity. The electrode used preferably has an electric resistivity of 1000Ω·cm or less and more preferably 100Ω·cm or less. The electrode can have Young's modulus of 0.1 to 600 MPa. Within these ranges, the electrode has improved flexibility, elasticity, and resistance to plastic deformation in actuator applications, so that an ion-conducting actuator with higher repeating durability can be produced.

The electrode may contain additional components of the polymer and the conductive material so long as they do not have an adverse effect on the function of the actuator. In particular, the polymer content can be set in the range of 10% by weight to 60% by weight. A higher conductive material content with respect to the amount of the polymer can result in a higher conductivity. At an amount of the polymer of less than 5% by weight, the resulting electrode layer does not have self-supporting properties and thus can be mechanically brittle. At an amount of the polymer exceeding 80% by weight, the conductive material content is relatively reduced; hence, the practical use can be difficult from the viewpoint of the response speed of the actuator and a force generated.

Component of Electrolyte Layer

The electrolyte layer is composed of a flexible material containing an electrolyte. The electrolyte layer is not particularly limited so long as the electrolyte layer is composed of a polymer containing an electrolyte.

Examples of the polymer include fluorine-containing polymer, such as tetrafluoroethylene, polyvinylidene fluoride; polyolefin polymers such as polyethylene and polypropylene; polybutadiene-based compounds; elastomers and gels of polyurethane-based polyurethane compounds; silicone-based compounds; thermoplastic polystyrene; polyvinyl chloride; and polyethylene terephthalate. These compounds may be used alone or in combination. Furthermore, these compounds may be functionalized and copolymerized with other polymers.

The polymer needs to contain an electrolyte. Thereby, an ion-conducting actuator can be operated by application of a voltage.

Examples of the electrolyte include lithium fluoride, lithium bromide, sodium bromide, magnesium chloride, copper sulfate, sodium acetate, sodium oleate, and sodium acetate. Furthermore, the electrolyte may be an ionic liquid. When the ionic liquid is used, a polyvinylidene fluoride-hexafluoropropylene copolymer [PVDF (HFP)], polyvinylidene fluoride (PVDF), perfluorosulfonic acid (Nafion), 2-hydroxyethyl methacrylate (HEMA), polymethyl methacrylate (PMMA), polyethylene oxide (PEO), and polyacrylonitrile (PAN) may be used as the polymer.

The ionic liquid for use in an actuator according to an embodiment of the present invention is referred to as an ordinary temperature molten salt or a fused salt. Specifically, the ionic liquid is a salt which is present in a molten state in a wide temperature range including ordinary temperature (room temperature). For example, the salt is present in a molten state at 0° C., preferably −20° C., and more preferably −40° C. Furthermore, the ionic liquid can have high ion conductivity.

In an actuator according to an embodiment of the present invention, various known ionic liquid may be used. An ionic liquid may be stably present in a liquid state at ordinary temperature (room temperature) or a temperature near ordinary temperature without limitation. Examples of the ionic liquid that can be used for an actuator according to an embodiment of the present invention include imidazolium salts, pyridinium salts, ammonium salts, and phosphonium salts. The ionic liquids may be used in combination of two or more thereof.

More specifically, compounds composed of cations represented by formulae (1) to (4) (the cation can be an imidazolium ion) and anions ($X^-$) can be exemplified as the ionic liquids.

[Chem. 1]

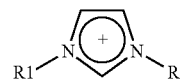

(1)

-continued

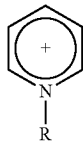
(2)

(3)

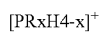
(4)

In each of formulae (1) to (4), R represents an alkyl group having 1 to 12 carbon atoms or an alkyl group having an ether bond and a total number of carbon atoms and oxygen atoms of 3 to 12. In formula (1), R1 represents an alkyl group having 1 to 4 carbon atoms. In formula (1), R and R1 may be different. In each of formulae (3) and (4), x represents an integer of 1 to 4.

Examples of the anion ($X^-$) include a tetrafluoroboric acid anion, a hexafluorophosphoric acid anion, a bis(trifluoromethanesulfonyl)imidic acid anion, a perchloric acid anion, a tris(trifluoromethanesulfonyl)carbon acid anion, a trifluoromethanesulfonic acid anion, a dicyanamide anion, a trifluoroacetic acid anion, an organic carboxylic acid anion, and a halogen ion. At least one selected from these anions can be used.

The electrolyte layer preferably has a thickness of 10 μm to 500 μm and more preferably 10 μm to 400 μm. A thickness exceeding 500 μm can result in an increase in elastic modules, thereby suppressing the deforming motion of the actuator. A thickness of less than 10 μm can result in a small amount of an ionic substance held and a reduction in the amount of the ionic substance fed into the electrode layer, thereby leading to an insufficient bending motion.

Method for Producing Actuator

Any method for producing an actuator according to this embodiment may be employed so long as the actuator can be produced by the method. A method can be employed in which the electrolyte layer is arranged between the plural electrode layers and in which the resulting laminate is subjected to hot pressing (heat press bonding). The term "hot pressing" used here includes pressing while heat is being applied; and an increase in temperature while the laminate is being pressed.

The temperature, pressing pressure, and time in the hot pressing are not particularly limited so long as the temperature is less than the decomposition temperature of the foregoing polymer. These conditions may be appropriately determined in response to a polymer used, a polymer compound included in the actuator, and the type of ion transferred. For example, the temperature in the hot pressing may be in the range of 30° C. to 150° C. The pressing pressure is preferably in the range of 1 to 100 kg/cm² and more preferably 10 to 50 kg/cm².

To ensure the fusion of the polymer fibers, the electrode layer can be subjected to hot pressing for a short time at a temperature near the softening point of the polymer (e.g., for PVDF-HFP, 110° C.) and then stacked with the electrolyte layer. If the treatment temperature is significantly lower than the softening point of the polymer, no fusion or substantially no fusion occurs. Alternatively, from the viewpoint of simply producing an actuator, although the degree of fusion may be reduced, the electrolyte layer may be arranged between the pair of polymer-fiber electrode layers, and then the resulting laminate may be subjected to hot pressing in one operation at a temperature near the softening point of the polymer as described above.

In the case where water, the ion-conducting material, the ionic liquid, or a mixture thereof is incorporated into the film of the actuator after the production of the actuator, the film of the actuator may be immersed in its solution. The concentration of the solution and the time for impregnation are not particularly limited, and a known method may be employed.

At least two electrode layers are needed to form the electrode layer on the surfaces of the electrolyte layer. It is also possible to perform a complicated motion by arranging many electrode layers on the surfaces of a planar electrolyte layer. It is possible to realize conveyance by a peristaltic movement, a micromanipulator, and so forth using such an element. The shape of an actuator according to an embodiment of the present invention is not limited to a planar shape. Any shaped element can be easily produced.

Embodiments

Embodiments of the present invention will be described below.

Measurement of Amount of Displacement of Actuator

An actuator is cut into a strip having a width of 1 mm, a length of 15 mm, and a predetermined thickness. A portion extending from an end to a position 3 mm from the end is held by a holder with a platinum electrode of a fixation device 6. A voltage is applied thereto in air (driving in air). With respect to the drive of the actuator, displacement at a drive voltage of +/−3.0 V and a driving frequency of 1 Hz is measured with a laser displacement gage at a position 10 mm distant from the fixed end.

Measurement of Conductivity of Electrode Layer

The conductivity of the electrode layer is determined as follows: A gold wire having a diameter of 50 μm is joined with metal paste on both ends and two points of the surface of the electrode layer along the direction of orientation of the polymer fibers. A constant current is passed through the gold wire on both ends using a constant current source. A voltage between the contacts on the surface is measured to determine the resistance of the electrode. In this case, the cross-sectional area is expressed as S=bd, where d represents the thickness of the electrode, and b represents the width of the electrode. The conductance is expressed as G=I/V [S], and conductivity=GL/S [S/cm], where I represents a passed electric current, V represents a measured voltage, and L represents the distance between the contacts arranged to measure the voltage.

First Embodiment

Actuator Including Electrolyte Layer Arranged Between Polymer-Fiber Electrode Layer and Cast-Film Electrode Layer In this embodiment, an actuator having a three-layer structure in which a polymer-fiber electrode layer, an electrolyte layer, and a film electrode are stacked in that order is exemplified.

The electrolyte layer is formed as follows: a polyvinylidene fluoride-hexafluoropropylene copolymer (PVDF-HFP) (100 mg, polymer) is mixed with a tetrahydrofuran (THF)/acetonitrile (5/1) mixed solvent and 1-butyl-3-methylimidazolium tetrafluoroborate (BMIBF 4) (100 mg, ionic liquid) at 80° C. The mixture is cast and dried to form a film.

A CNT film-like electrode layer is obtained as follows: A mixture of SWCNTs (50 mg, conductive material, trade name: HiPco, manufactured by Unidym) each having a diameter of about 1 nm and a length of 1 μm, BMIBF 4 (80 mg), and dimethylformamide (DMF) (1 mL) is subjected to ball mill treatment for 30 minutes. PVDF-HFP (80 mg) dissolved in DMF (2 mL) is added to the mixture that has been subjected to the ball mill treatment. The resulting mixture is subjected to ball mill treatment for another 30 minutes to form a black paste in which CNTs are dispersed. The black paste is cast on a Teflon (registered trademark) sheet and dried to form the film-like electrode layer. Electron microscope observation of the film electrode layer shows that the CNTs are intricately aggregated and entangled in the layer. The electrical conductivity of the film varies depending on measurement points and is in the range of 8 to 15 S/cm. The proportion of orientation of CNTs in the film surface direction of the foregoing electrode layer, i.e., the P value, is determined to be 1.

The polymer-fiber electrode layer is formed as follows: The black paste is diluted with DMF to form a diluted black paste solution. The diluted black paste solution is ejected by the electrospinning method. The resulting fibers are wound on a drum collector. Thereby, a large-area polymer-fiber electrode layer can be easily produced. That is, an electrospinning device (manufactured by MEC COMPANY LTD.) is used. The diluted black paste solution is charged into a tank. The application of a voltage of 25 kV to a spinneret allows the conductive material dispersion to be ejected toward the rotating drum collector. In this case, the drum collector is rotating at 1500 rpm. The ejection is performed for 1 hour to provide the polymer-fiber electrode layer including the polymer fibers containing the conductive material. The resulting polymer fibers each have a thickness of 1.5 µm. Even if the electrical conductivity of the resulting electrode layer is measured in any point in a direction of orientation of the fibers, the electrical conductivity is found to be 300 S/cm. In addition, even if the degree of orientation of the polymer fibers is measured in any point in the direction of orientation of the fibers in the plane of the polymer-fiber electrode layer, the degree of orientation of the polymer fibers is 85%. Even if the proportion of orientation of CNTs in the film surface direction of the foregoing electrode layer, i.e., the P value, is measured in any point in the direction of orientation of the fibers in the plane of the polymer-fiber electrode layer, the proportion of orientation of CNTs is found to be 0.2.

The electrolyte layer is arranged between the resulting electrode layer and the polymer-fiber electrode layer (an actuator produced by cutting the large-area electrode layer into a strip having a width of 1 mm and a length of 15 mm, the longitudinal direction of the actuator being parallel to the direction of uniaxial orientation of the polymer fibers) to form a laminate. Then the laminate is subjected to heat press bonding with a hot press heated to 40° C. at an impressed pressure of 0.4 MPa for 1 minute. The resulting laminate is dried in vacuo to provide the actuator including the electrolyte layer arranged between the polymer-fiber electrode layer and the film electrode. Note that before using this polymer-fiber electrode layer as the actuator, the polymer-fiber electrode layer is pressed at 1 MPa.

The thickness of the actuator is 115 µm (the thickness of the electrolyte layer is 15 µm, the thickness of the electrode layer is 50 µm, and the thickness of the polymer-fiber electrode layer is 50 µm).

First Comparative Embodiment

Actuator Including Electrolyte Layer Arranged Between Two Cast-Film Electrode Layers In this comparative embodiment, an actuator having a three-layer structure, including two film electrodes, in which one film electrode layer, an electrolyte layer, and the other film electrode layer are stacked in that order is exemplified.

Here, the actuator is produced as in the first embodiment, except that two electrode layers each the same as the CNT film-like electrode layer produced in the first embodiment (the remainder in the first embodiment are used) are used.

Second Embodiment

Actuator Including Electrolyte Layer Arranged Between Two Polymer-Fiber Electrode Layers: Directions of Orientation of Polymer Fibers of the Two Electrode Layers are Identical to Each Other In this embodiment, an actuator having a three-layer structure which includes two polymer-fiber electrode layers as illustrated in FIG. 2 (in FIG. 2, two sublayers are schematically illustrated for each of the polymer-fiber electrode layers) and in which one polymer-fiber electrode layer, an electrolyte layer, and the other polymer-fiber electrode layer are stacked in that order is exemplified. Here, the electrolyte layer is produced as in the first embodiment. The actuator is produced as in the first embodiment, except that two electrode layers each the same as the polymer-fiber electrode layer produced in the first embodiment (the remainder in the first embodiment are used) are used. Note that the polymer fibers are arranged in the uniaxial direction in the plane of the electrode layer (the polymer fibers are arranged in the longitudinal direction of the strip-like actuator having a width of 1 mm and a length of 15 mm).

Third Embodiment

Actuator Including Electrolyte Layer Arranged Between Two Polymer-Fiber Electrode Layers: Directions of Orientation of Polymer Fibers of the Two Electrode Layers are Identical to Each Other, and the Polymer Fibers Each have a Smaller Thickness than that in the Second Embodiment This embodiment is a modification of the second embodiment. The thickness of each of the polymer fibers of the polymer-fiber electrode layer is half the thickness of each polymer fiber in the second embodiment. The actuator having a three-layer structure in which one polymer-fiber electrode layer, an electrolyte layer, and the other polymer-fiber electrode layer are stacked in that order is exemplified.

Here, the electrode layers are produced as in the first embodiment. Furthermore, each of the polymer-fiber electrode layers is produced as in the first embodiment, except that the rotational speed of the drum collector is set to 3000 rpm.

Thus, the thickness of the resulting polymer fibers is 0.3 µm. Even if the electrical conductivity of each of the resulting electrode layers is measured in any point in a direction of orientation of the fibers, the electrical conductivity is found to be 500 S/cm. In addition, even if the degree of orientation of the polymer fibers is measured in any point in the direction of orientation of the fibers in the plane of each of the polymer-fiber electrode layers, the degree of orientation of the polymer fibers is 95%. Even if the proportion of orientation of CNTs in the film surface direction of each of the electrode layers, i.e., the value, is measured in any point in the direction of orientation of the fibers in the plane of the polymer-fiber electrode layer, the proportion of orientation of CNTs is found to be 0.1.

The thickness of the actuator is 115 µm (the thickness of the electrolyte layer is 15 µm, and the thickness of each of the polymer-fiber electrode layers is 50 µm).

Comparison of Film-Like Electrode Layer and Polymer-Fiber Electrode Layer in Direction of Polymer Fibers As described in the foregoing embodiments, by forming the electrode layer in such a manner that the polymer fibers containing the conductive material are arranged in the uniaxial direction in the plane of the electrode layer, it is possible to form a large-area electrode layer having a surface with uniform and satisfactory conductivity.

Furthermore, as described above, in each of the first to third embodiments, the electrical conductivity of the polymer-fiber electrode layer is 1 or more orders of magnitude more than those of the cast-film electrode layers in the first embodiment and the second comparative embodiment. In addition, there is almost no error in the point of measurement. This demonstrates that the conductive material (CNTs) are uniformly and satisfactorily dispersed in the direction of the polymer fibers in the plane of the polymer-fiber electrode layer and that thus uniform and satisfactory electrical conductivity is obtained in the plane of the polymer-fiber electrode layer, as compared with the film-like electrode layer. That is, the aggregation and entanglement of the conductive material are suppressed in the polymer fibers without inhibiting the intrinsic electrical conductivity of the conductive material, so that the electrode layer has the uniformly dispersed conductive material.

Furthermore, in each of the first to third embodiments, the proportion of orientation of the conductive material (CNTs) in the polymer-fiber electrode layer, i.e., the P value, is in the range of 0.1 to 0.2, which is very close to a value when the CNTs are completely oriented (P=0). This also demonstrates that for the polymer-fiber electrode layer, the conductive material are uniformly and satisfactorily dispersed in the direction of the polymer fibers in the plane of the polymer-fiber electrode layer and that thus uniform and satisfactory electrical conductivity is obtained in the plane of the polymer-fiber electrode layer. A smaller thickness (less than 1 μm) of each fiber results in a higher electrical conductivity and a higher degree of orientation of the fiber and results in the increases in electrical conductivity and the degree of orientation of the CNTs. This demonstrates that the aggregation and entanglement of the CNTs are inhibited to enhance the effect of uniformly dispersing the CNTs.

Comparison of Actuator Performance

Each of the actuators has a structure in which the electrolyte layer is arranged between the electrode layers (here, the electrode layers including at least one polymer-fiber electrode layer). Thus, the application of electrical energy through the electrodes allows ions in the electrolyte to be efficiently conducted, thereby resulting in deformation operations.

An AC electric potential of +/−3.0 V is applied between both electrodes of each of the actuators produced in the first to third embodiments and the first comparative embodiment at a frequency of 0.1 Hz. The properties of the actuators are measured using the measurement method and the measurement apparatus described above. Table 1 shows the results.

TABLE 1

Comparison of amount of deformational displacement of actuator in Examples 1, 2, and 3 and Comparative Example 1 during application of drive voltage

| No | Actuator | Rate of increase in deformational displacement (%) $\left( \frac{\left( \text{Amount of displacement in each Example} \right) - \left( \text{Amount of displacement in Comparative Example 1} \right)}{\text{Amount of displacement in Comparative Example 1}} \right) \times 100$ |
|---|---|---|
| 1 | Actuator in Example 1 | 15 |
| 2 | Actuator in Example 2 | 40 |
| 3 | Actuator in Example 3 | 50 |

Table 1 shows that in the case where the electrode of the actuator includes the polymer fibers containing the conductive material and where the polymer fibers are arranged in the uniaxial direction in the plane of the electrode layer, an electric potential can be uniformly impressed in the plane of the electrode layer, as compared with the case where the known film-like electrode layers are used. Thereby, the amount of displacement of the actuator is increased, significantly improving the deformation response characteristic. Note that in the actuator (No. 1), the polymer-fiber electrode layer is used as a cathode, causing the bending deformation toward the film-like electrode layer. When the polymer-fiber electrode layer is used as an anode to cause the bending deformation toward the film-like electrode layer, the proportion of deformational displacement is 8% with respect to that in the first comparative embodiment.

Table 1 also demonstrates that the rate of increase in the deformational displacement of the actuator (No. 2) is higher than that of the actuator (No. 1). That is, in the case where both electrode layers include the polymer fibers containing the conductive material and where the polymer fibers are arranged in the uniaxial direction in the plane of each electrode layer, the amount of displacement of each actuator is increased, significantly improving the deformation response characteristic. Furthermore, Table 1 also demonstrates that the rate of increase in the deformational displacement of the actuator (No. 3) is higher than that of the actuator (No. 2). That is, in the case where each of the polymer fibers has a thickness of less than 1 μm, an electric potential can be uniformly applied to the plane of each of the electrode layers, resulting in a further increase in the amount of displacement of the actuator and significantly improving the deformation response characteristic.

Electrode Layer in which Fusion of Polymer Fiber Containing Conductive Material Is More Securely Performed In the polymer-fiber electrode layers used in the first embodiment, the polymer-fiber electrode layers are subjected to hot pressing under different conditions. After the hot pressing, the polymer-fiber electrode layers (films) are compared in terms of strength.

That is, sample A is prepared under the same conditions as in the first embodiment: the polymer-fiber electrode layer is subjected to heat press bonding with a hot press heated to 40° C. at an impressed pressure of 0.4 MPa for 1 minute. Sample B is prepared as follows: the polymer-fiber electrode layer is subjected to heat press bonding with a hot press heated to 110° C., which is close to the softening point of PVDF-HFP, at an impressed pressure of 0.4 MPa for 1 minute.

Next, each of the samples A and B of the polymer-fiber electrode layers (films) is stretched with researcher's hands in a direction perpendicular to a direction in which longitudinal directions of the polymer fibers are aligned (uniaxial direction), and degrees of tearing thereof are qualitatively compared. The results demonstrate that sample B, which is subjected to heat press bonding at 110° C., which is close to the softening point of PVDF-HFP, has high resistance to tearing compared with sample A. This shows that the polymer fibers containing the conductive material are more securely fused.

That is, the polymer-fiber electrode layer (film) has high strength. Even if a load is applied, the structure from which the fibers do not shift easily is realized. Thus, even if a heavy load is applied, the uniaxial orientation of the conductive polymer fibers is suppressed from being reduced. This results in the suppression of the occurrence of a potential difference between an end portion, to which a voltage is applied, and the other end.

Therefore, the use of the electrode layer including the securely fused polymer fibers will result in an actuator in which the uniaxial orientation of the conductive polymer fibers is suppressed from being reduced even if a heavier load is applied from an object to be driven (the occurrence of a potential difference between an end portion, to which a voltage is applied, and the other end in the plane of the electrode layer is stably suppressed).

While the embodiments of the present invention have been described, the present invention is not limited thereto.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-278960, filed Dec. 8, 2009, which is hereby incorporated by reference herein in its entirety.

The invention claimed is:

1. An actuator comprising:
a pair of electrode layers;
an electrolyte layer arranged between the pair of electrode layers, the electrolyte layer containing an electrolyte; and
terminals in contact with the pair of electrode layers, the terminals being configured to apply a voltage between the electrode layers,
wherein at least one of the pair of electrode layers includes a plurality of linear electrodes in contact with the electrolyte layer, longitudinal directions of the linear electrodes being arranged parallel to a direction from a terminal portion where the at least one of the electrode layers is in contact with a corresponding one of the terminals toward an end portion of the at least one of the electrode layers, and the end portion being remote from the terminal portion, the plurality of linear electrodes being closely arranged so that parts of the plurality of linear electrodes are in contact with each other, and
wherein the application of a voltage to the terminals allows ions in the electrolyte layer to be transferred, thereby displacing the end portion.

2. The actuator according to claim 1, wherein the linear electrodes are formed of polymer fibers containing a conductive material.

3. The actuator according to claim 1, wherein the terminals are fixed at a fixed portion that is located at one end portion of the actuator, and the other end portion of the actuator is displaced.

4. The actuator according to claim 2, wherein each of the polymer fibers has a thickness of 0.05 μm or more and less than 1 μm.

5. The actuator according to claim 2, wherein at least some of the polymer fibers containing the conductive material are fused.

6. An actuator comprising:
a pair of electrode layers;
an electrolyte layer arranged between the pair of electrode layers, the electrolyte layer containing an electrolyte; and
terminals in contact with the pair of electrode layers, the terminals being configured to apply a voltage between the electrode layers,
wherein at least one of the pair of electrode layers includes a plurality of linear electrodes formed in bundles of polymer fibers containing a conductive material, longitudinal directions of the plurality of linear electrodes being arranged parallel to a direction from a terminal portion where the at least one of the electrode layers is in contact with a corresponding one of the terminals toward an end portion of the at least one of the electrode layers, and the end portion being remote from the terminal portion so that electrons or holes are transferred from the terminal portion to the end portion when a voltage is applied to the electrode layers through the terminals,
wherein the application of a voltage to the terminals allows ions in the electrolyte layer to be transferred, thereby displacing the end portion, and
wherein each of the polymer fibers has a thickness of 0.05 μm or more and less than 1 μm.

* * * * *